United States Patent [19]

Ribka et al.

[11] 3,915,973

[45] Oct. 28, 1975

[54] PROCESS FOR THE PREPARATION OF MIXED ETHERS OF METHYLOLATED AMINOTRIAZINE

[75] Inventors: Joachim Ribka, Offenbach am Main-Bürgel; Walter Michel, Frankfurt am Main-Fechenheim; Helmut Durr, Frankfurt am Main, all of Germany

[73] Assignee: Cassella Farbwerke Mainkur AG, Germany

[22] Filed: Apr. 10, 1973

[21] Appl. No.: 349,804

[30] Foreign Application Priority Data

May 2, 1972 Germany.............................. 2221367

[52] U.S. Cl.............................. 260/249.6; 117/230
[51] Int. Cl.² ....................................... C07D 251/64

[58] Field of Search .................................. 260/249.6

[56] References Cited
UNITED STATES PATENTS

| | | | |
|---|---|---|---|
| 2,709,693 | 5/1955 | Widmer...................... | 260/249.6 X |
| 3,352,838 | 11/1967 | Teepll et al................. | 260/249.6 X |
| 3,396,209 | 8/1968 | Sekmakas et al. ........... | 260/249.6 X |
| 3,499,849 | 3/1970 | Sekmakas et al. ........... | 260/249.6 X |
| 3,630,998 | 12/1971 | Schibler...................... | 260/249.6 X |
| 3,661,819 | 5/1972 | Koral et al................... | 260/249.6 X |

*Primary Examiner*—John M. Ford
*Attorney, Agent, or Firm*—Connolly and Hutz

[57] ABSTRACT

Reaction of a mixture of two or more ethers of a methylolated aminotriazine and a mineral acid at a pH of 0 to 3 and a temperature of from 10° to 60°C. to obtain mixed ethers of methylolated aminotriazine.

6 Claims, No Drawings

PROCESS FOR THE PREPARATION OF MIXED ETHERS OF METHYLOLATED AMINOTRIAZINE

The invention relates to a novel process for the preparation of mixed ethers of methylolated aminotriazine, particularly of mixed ethers of the methylolated melamine.

In the lacquer industry, more and more organic solvents are being abandoned as solvent systems for the coating agents to be applied. Instead, the coating agents are being increasingly used in aqeuous systems.

Suitable coating agents for application in aqueous systems, for example, are such which consist of a highly methylolated and highly etherified aminotriazine as the aminoplast constituent and polymeric substances, such as polyester resins or acrylate resins neutralized with volatile amines. The highly methylolated and highly etherified aminotriazines are distinguished by a high stability in aqueous solvent systems. The most important aminotriazine derivative of this type is hexamethoxymethylmelamine. In the majority of its commercial forms, it is liquid and water-soluble without limitations. On the other hand, there are specific application requirements, e.g., the electrophoretic coating of metals wherein a water-solubility of the aminoplasts is undesired or even the stability of the hexamethoxymethylmelamine in solution is insufficient. In such instances, mixed ethers of methylolated aminotriazine are used; these are methylolated aminotriazines which had been etherified with two or more different alcohols, particularly such which, aside from some methoxy groups, also contain higher alkoxy groups.

For the preparation of such mixed ethers of methylolated melamine, it is known (Ger. Publ. Appln. 1,669,593) to react hexamethoxymethylmelamine under acidic conditions with a large molar excess of the second alcohol concerned and thus to effect a partial exchange of the methoxy groups.

This exchange is difficult to control, however, because of high sensitivity to the temperature, the pH and the duration of the acidic condition. The reproducibility of the reaction on a technical scale, therefore, is highly doubtful. It is difficult for this reason to produce in a technical operation products of constant composition. In addition, in the working up of the reaction solution, there result mixtures of alcohols which must separated by distillation for recovery and this is responsible for additional costs.

It has now been found that these difficulties may be avoided and that the desired mixed ethers may be produced in a simple manner.

The novel process for the preparation of mixed ethers of methylolated triazines is characterized in that a mixture of two or more ethers of methylolated triazine is reacted with the addition of acid.

An ether of a methylolated triazine is understood to be a product which has resulted from an etherification of a methylolated triazine with a single alcohol and consequently contains only a single type of alkyl group. Such an ether has the formula:

$$TH_a\ F_b\ R_c \qquad I$$

wherein

T is the radical of an aminotriazine, which formally results from the removal of amino hydrogen atoms from the aminotriazine $TH_{2m}$.

F is $-CH_2OH$ and/or $-CH_2O$ radicals which are connected by carbon to the amino nitrogen atoms of the aminotriazine radical.

R is alkyl with 1 to 6 carbon atoms connected to the $-CH_2O$ radicals.

a, the total number of amino hydrogen atoms which are not removed, equals the number $2m-b$, b, the total number of F radicals, equals a number from $1.6\ m$ to $2\ m$, c, the total number of R radicals, equals a number from $1.1\ m$ to $2\ m$.

m is the number of amino groups present in the aminotriazine radical and $c \leq b$.

Typical examples of aminotriazines include acetoguanamide ($m = 2$), benzoguanamine ($m = 2$), bisguanamine ($m = 4$), formoguanamine ($m = 2$) and melamine ($m = 3$), the latter being preferred.

For the stated aminotriazines, taking into consideration the above-mentioned definitions for $a$, $b$, $c$ and $m$, there result the following numerical values:

| m | 2 | 3 | 4 |
|---|---|---|---|
| a | 0.8 to 0 | 1.2 to 0 | 1.6 to 0 |
| b | 3.2 to 4 | 4.8 to 6 | 6.4 to 8 |
| c | 2.2 to 4 | 3.3 to 6 | 4.4 to 8 |

It is shown from this and from the above general definitions of $a$, $b$, $c$ and $m$ that in Formula I, fractional index numbers may occur. Even in the mixed ethers prepared according to the invention, there generally occur fractional index numbers. These circumstances are explained in more detail first of all in connection with melamine. Melamine has three amino groups. Each of these amino groups may react with formaldehyde in a molar ratio of 1:2, so that in a complete reaction of all three amino groups with formaldehyde, there results hexamethylolmelamine. However, it is often determined that in products which are designated as hexamethylolmelamine and therefore should contain six methylol groups, there are present fewer than six methylol groups.

Analysis shows fractional numbers for the methylol groups present in the molecule. For example, in a product designated as hexamethylolmelamine, 5.9 or 5.6 methylol groups, for example, are present in the molecule. Such fractional numbers are an indication of the fact that the product actually concerns a mixture of several compounds. The fractional number for the methylolation degree appears as the average value for the methylolation degrees of the individual compounds.

A methylolated melamine with a methylolation degree of 5.9, for example, is a mixture wherein actual hexamethylolmelamine is present in excess aside from pentamethylolmelamine and perhaps traces of tetramethylolmelamine or trimethylolmelamine.

Of course, it is also possible to methylolate melamine to lower methylolation degrees. Here too a fractional number for the methylolation degree shows that a mixture of different highly methylolated melamines is present. A melamine with a methylolation degree of, e.g., 3.9, consists of a mixture of tetramethylolmelamine and small amounts of di-, tri-, penta- and hexamethylolmelamines.

In the industry, mixtures are treated as if they were homogeneous compounds. The methylolation products with a fractional methylation degree, in their further reaction — e.g., in the etherification with alcohols — again yield mixtures. In the etherification, either all methylol groups present or only a portion thereof may be etherified. Thus, products may be prepared which have the following composition, for example:

$$T'H_{0.8}F_{5.2}R_{3.5} \qquad \text{II}$$

In this formula
T' is a melamine radical, which formally results from the removal of amino hydrogen atoms from melamine, $T'H_6$, and
F and R have the previously indicated meanings.

Formula II shows that in the product $5.2 - 3.5 = 1.7$ non-etherified OH groups and 0.8 non-methylolated amino hydrogen atoms of melamine are present. Even with such an ether, the occurrence of fractional index numbers shows that a mixture of varied strongly methylolated and varied strongly alkylated compounds is present.

In the instant process, at least two different ethers of a methylolated triazine are reacted with the addition of acid. In this instance, the reaction equation (1) is as follows:

$$\underset{\text{I}}{TH_aF_bR_c} + n\underset{\text{II}}{TH_dF_eR'_f} \rightarrow (n+1)\underset{\text{III}}{TH_gF_hR_iR'_k} \quad (1)$$

Aside from the already mentioned symbols T, F, R, a, b, c and m, R' is alkyl, different from R, with 1 to 6 carbon atoms, which is connected to the oxygen of the —CH$_2$O radicals, d is the number $2m - e$,
e is a number from 1.6 m to 2 m,
f is a number from 1.1 m to 2 m,
$f \leq e$, n is a number from $(c-1)$ to $\dfrac{1}{f-1}$, $$g = \frac{a + nd}{n + 1},$$

$$h = \frac{b + ne}{n + 1},$$

$$i = \frac{C}{n + 1},$$

$$k + \frac{nf}{n+1}.$$

In accordance with the given definitions for d, e and f, there result, with $= 2$, $m = 3$ and $m = 4$, numerical numerical ranges for d, e and f which correspond to the numerical ranges given in the table for a, b and c. In the general formulae I and II, a may numerically coincide with d, b with e, and c with f, but they do not have to.

As seen from the reaction equation (1), both ethers I and II, which are derived from the same triazine but contain different alkyl radicals R and R', are converted in a molar ratio of 1:n. The numerical value of n may then, for example, be 7 ($n = c-1$ for $c = 2\ m$ and $m = 4$) to 1/7

$$(n = \frac{1}{f-1}$$

for $f = 2\ m$ and $m = 4$). In melamine with $m = 3$, n may be a number from 5 to 1/5.

If for the molar number n a limiting number $n = c-1$ is selected, then after the reaction equation (1) there is obtained a mixed ether III as the end product, whose index symbols g, h, i and k have the following values:

$$g = \frac{a + d(c-1)}{c}$$

$$h = \frac{b + e(c-1)}{c}$$

$$i = 1$$

$$k = \frac{f(c-1)}{c}$$

If in the reaction equation (1), the other limiting number $$n = \frac{1}{f-1}$$

is selected for the molar number n, then as the end product there is obtained a mixed ether III whose index symbols g, h, i and k have the following values:

$$g = \frac{a(f-1) + d}{f}$$

$$h = \frac{b(f-1) + e}{f}$$

$$i = \frac{C(f-1)}{f}$$

$$k = 1$$

As the starting products for the present invention, ethers are preferably used which are derived from melamine. Melamine has three amino groups. Therefore, in this instance $m = 3$, a and d may then be the numbers from 1.2 to 0 and b and e may then be numbers from 4.8 to 6, and c or f may be the numbers from 3.3 to 6. As starting products, such ethers of methylolated melamines are preferably used wherein b or e are numbers from 5 to 6 and c or f are numbers from 4.5 to 6. Then a and d become numbers from 1 to 0.

In the case of melamine, T' or T is the radical:

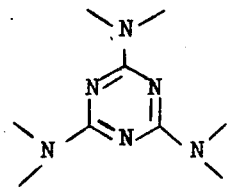

which has formally resulted by the removal of all amino hydrogen atoms from the melamine $T'H_6$ or $TH_6$, i.e.,

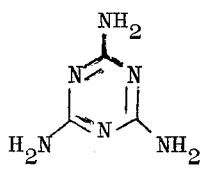

According to the novel process, the ethers used as starting products are mixed and an acid is added to the mixture. Suited for this purpose are all those acids which possess at 25°C. a $pK_a$ value equal to or less than 1.5. Mineral acids, such as hydrochloric acid, perchloric acid, sulfuric and nitric acid are preferred. Further suitable are organic acids having a $pK_a^{25}$ value equal to or less than 1.5, for instance dichloroacetic acid, trichloroacetic acid and p-toluene sulfonic acid (For the definition of $pK_a$, cf. A. Albert + E.P. Sergeant "Ionization constants of acids and bases," Publishers John Wiley + Sons, Inc. New York (162), page 7). As much acid is added as is necessary to adjust the pH value in the reaction mixture to 0 to 3 and preferably 0.5 to 1.5. The pH value in the reaction mixture is determined with a glass electrode while agitating after diluting a 10 g. assay with 50 ml. of a 1:1 mixture of ethanol and water.

Temperatures of 10° to 60°C. and especially 20° to 40°C. are preferred and normally reaction times of ½ to 2 hours are required at these temperatures. However, higher and lower temperatures may be used, i.e., temperature is not actually critical to the success of the reaction.

The reaction may also be carried out in a suitable inert solvent. These include all organic liquids which are compatible with the mixture of reactants and do not impair the reaction — for example, aliphatic and aromatic hydrocarbons such as benzene, toluene; halogenated hydrocarbons such as chloroform or carbon tetrachloride and aliphatic primary and secondary alcohols such as methanol and isobutanol, preferably those whose alkyl radicals are present in the reacting ethers. It suffices to use the solvent, whose presence is not absolutely necessary, in amounts of not more than 10 % by weight and preferably not more than 5 % by weight, based on the weight of the total reaction mixture. If alcohols are used as solvents, they and the ether reactants may undergo, to a small degree, an exchange reaction which involves the alkyl radicals of the ethers of the methylolated aminotriazines and the alkyl radical of the alcohol used as solvent. The composition of the end product in such instances may deviate from the calculated composition up to about 20%.

Preferably, one of the ethers used as the starting constituent is a methylether of a methylolated aminotriazine, particularly the methylether of a methylolated melamine. The progress and the conclusion of the reaction may then be determined by observing the water-soluble portion in the reaction mixture. The reaction is completed when the water-solubility has been lowered to a constant minimum value.

During the reaction, the mixture is suitably stirred. After completion of the reaction, it may be neutralized with sodium hydroxide or with another suitable base or standardized to a weakly alkaline pH value of 8–9. Then, all volatile constituents may be removed under vacuum (0.1 to 20 Torr) at ca. 40° to 60°C. The resulting product may then be filtered.

According to the novel process, reactions of more than two ethers of a methylolated aminotriazine are also possible. If, for example, three ethers, I, II and IV, are used as starting products, then the reaction proceeds according to the following reaction equation (2):

$T$, $F$, $R$, $R'$, $a$, $b$, $c$, $d$, $e$ and $f$ are as aforesaid and $R''$ is alkyl, different from $R$ and $R'$, with 1 to 6 carbon atoms, which is connected to the oxygen of the $—CH_2O$ radicals, $l$ is the number $2m - r$ wherein $m$ is as aforesaid,
$r$ is a number from $1.6\,m$ to $2\,m$,
$s$ is a number of $1.1\,m$ to $2\,m$,
$s \leq r$, $$p \text{ is a number from } \frac{c}{f} \text{ to } \left[(c-1) - \frac{c}{s}\right],$$

$$q \text{ is a number from } \left[(c-1) - \frac{c}{f}\right] \text{ to } \frac{c}{s},$$

$$t = \frac{a + pd + ql}{p + q + 1},$$

$$u = \frac{b + pe + qr}{p + q + 1},$$

$$v = \frac{c}{p + q + 1},$$

$$w = \frac{pf}{p + q + 1}, \quad \text{and}$$

$$x = \frac{qs}{p + q + 1}.$$

Within the ranges given for $p$ and $q$, the numbers of $p$ and $q$ are selected in such a manner that the requirements
$v \geq 1$
$w \geq 1$
$x \geq 1$
are fulfilled.

For melamine with $m = 3$, there results on the basis of the stated definitions for
$p$ a number of 0.55 to 4.45 and for
$q$ a number of 4.45 to 4.55.

If $p = q = 1$, for example, is selected, then the three different ethers of the general formula I, II and IV are reacted in the molar ratio 1:1:1, and the ratios are very clear. Particularly simple ratios result if besides $a = d = 1$, $b = e = r$ there is now selected $c = f = s$. The reaction then proceeds as follows:

$$TH_aF_bR_c + \quad TH_aF_bR'_c + \quad TH_aF_bR''_c \rightarrow \quad 3TH_aF_bR_{\frac{c}{3}}R'_{\frac{c}{3}}R''_{\frac{c}{3}} \quad (3)$$

VI         VII         VIII         IX

Since the radical T of the aminotriazine $m$ has amino groups, a maximum of 2 $m$ different ethers may be reacted in accordance with the novel process; they yield a mixed ether with 2 $m$ varied alkyl groups. If various ethers of a methylolated aminotriazine are used, $z$ being a whole number and $$2 \leq z \leq 2m,$$

then the alkylation degree in each starting ether must be equal to or greater than $z$.

According to the novel process, the mixed ethers of methylolated aminotriazines, particularly the mixed ethers of methylolated melamines, may be prepared by the suitable selection of the starting ethers to be used and of the quantity ratios. The influence of temperature, pH and time are magnitudes which, in the technical execution of chemical reactions, are subject to certain variations. A further considerable advantage of the novel process is that it does not require any working up of a mixture of various alcohols.

It was completely unexpected that the condensation reaction to be expected, i.e., that which takes place during the acid treatment of solvent-free aminotriazine resins, either does not occur or only occurs to a negligible degree in the present process. The viscosity of the mixed ether in most instances is equal to the average viscosity of the ether mixture used or higher, but only very inconsequentially so.

The utilities of the mixed ethers prepared according to the present process are the same as those of the mixed ethers prepared in accordance with the previously known processes. For example, the ethers of the present process are outstandingly suitable as aminoplast constituents, for example, in coating agents for the electrophoretic coating of metals.

The following examples illustrate the present process:

EXAMPLE 1

Seven hundred twenty parts by weight of methyletherified, fully water-soluble methylolmelamine with 5.4 mol total —$CH_2OH$ and —$CH_2O$— groups and 4.8 mol methylether groups to 1 mol melamine together with 400 parts by weight of an n-butyletherified methylolmelamine with 5.6 mol total —$CH_2OH$ and —$CH_2O$— groups and 4.6 mol n-butylether groups to 1 mol melamine were mixed at 40°C. during stirring with a composition of 50 parts by weight n-butanol and 13 parts by weight concentrated nitric acid. Stirring occurring for 30 minutes at 35°C. and the mixture was then adjusted with sodium hydroxide to a pH value of 8–9, freed of all volatile constituents under vacuum at 40°–60°C. and filtered. The viscosity of the completely water-insoluble mixed ether amounted at 25°C. to 15–20 poise. The mixed ether contained 5.5 mol —$CH_2OH$ and —$CH_2O$— groups, 3.7 mol methoxy groups and 1.4 mol n-butoxy groups per mol melamine.

EXAMPLE 2

Six hundred g of a methyl-etherified methylolmelamine with 5.8 mol —$CH_2$—O— groups per mol melamine, of which 4.9 mol are methylated, 600 g of a compound, which per mol melamine contained 5.1 mol n-butoxymethyl groups and 15.5 g concentrated nitric acid in the absence of a solvent were mixed and stirred at 35°C. for 40 minutes. The mixture was adjusted with sodium hydroxide to a pH between 8 and 9 and freed of water under vacuum (15–30 Torr) at 40°–60°C. After the separation of the salt, a completely water-insoluble liquid was obtained with a viscosity of 25 poise at 25°C. The thusly prepared mixed ether per mol melamine contained 5.4 mol —$CH_2$—O— groups, of which 2.9 mols were methyl etherified and 2.3 mols were n-butyl etherified.

EXAMPLE 3

Four hundred g of a completely water-soluble, methyl etherified methylolmelamine, which per mol melamine contained 6 mol of —$CH_2$—O— groups of which 5.6 mol were methylated, were agitated at 30°C. with 700 g of a compound, which per mol melamine contained 0.7 mol of free —$Ch_2$—OH groups and 5.3 mol of ethoxymethyl groups, in the presence of 20 g concentrated hydrochloric acid. It was further stirred for 60 minutes at the stated temperature, then adjusted with sodium hydroxide to a pH value between 8 and 9, and the volatile parts were removed under vacuum (15–30 Torr) at 40°–60°C. After the separation of sodium chloride, there was obtained a completely water-soluble substance with a viscosity of 25 poise at 25°C. The thusly prepared mixed ether contained per mol of melamine, 6 mol —$CH_2$—O— groups, of which 2.16 mol were methyl etherified and 3.26 mol n-ethyl etherified.

EXAMPLE 4

Three hundred sixty-four g of a methyl etherfied methylolmelamine, which contained per mol of melamine, 5.6 mol —$CH_2$—O— groups, of which 5.0 mol were methyl etherified, 432 g of an ethyl etherified methylolmelamine, which per mol of melamine contained 5.6 mol —$CH_2$—O— groups of which 4.9 mol were ethyl etherified and 553 g. of an n-butyl etherified methylol melamine, which per mol of melamine contained 5.9 mol —$CH_2$—O— groups of which 4.5 mol were n-butyl etherified, were stirred together and heated at 35°C. Then 16 ml concentrated nitric acid were introduced and the mixture further agitated for 1 hour at 35°C. Then while cooling, the mixture was adjusted with a solution of about 12 ml of 50% sodium hydroxide in 100 ml water to a pH of 8 to 9.5. The solution was freed of volatile constituents under vacuum (ca. 15–30 Torr) at 60°C. and filtered. The thusly prepared mixed ether was a colorless, completely water-insoluble oil with a viscosity of 38 poise at 25°C. (The viscosity was determined in an Epprecht viscosimeter). The mixed ether contained per mol of malamine, 5.7 mol —$Ch_2$—O— groups of which 1.65 mol were methyl etherified, 1.61 mol were ethyl etherified and 1.5 mol were n-butyl etherified.

EXAMPLE 5

One thousand g of crystallized methyl etherified methylolbenzoguanamine containing 4.0 mol —$CH_2$—O— groups per mol, of which 3.9 mol were methyl etherified, were heated to 70°C. while stirring with 1000 g of an n-butyl etherified methylolbenzoguanamine containing per mol of benzoguanamine, 3.8 mol —$CH_2$—O— groups of which 2.9 mol were n-butyl etherified, and 400 g xylene to obtain a clear solution. Then, it was quickly cooled to 50°C. and mixed with 46 ml concentrated nitric acid. It was further stirred at a temperature of 50°C. for 1 hour and subsequently adjusted while cooling to a pH of 8 to 9 with ca. 44 ml 50% sodium hydroxide. The turbid solution was freed with agitation under vacuum (ca. 15 to 30 Torr) at 40° to 60°C. of water and xylene and finally filtered at 60°C. There was obtained a mixed ether of methylolbenzoguanamine in the form of a colorless liquid with a viscosity of 42 poise at 25°C. (the viscosity was determined in an Epprecht viscosimeter). The mixed ether contained, per mol of benzoguanamine, 3.9 mol —$CH_2$—O— groups, of which 2.18 mol were methyl etherified and 1.28 mol were n-butyl etherified. The mixed ether showed no tendency to crystallize even after seeding with the crystallized methylether of methylolbenzoguanamine used as starting material.

We claim:

1. A process for preparing mixed ethers of a methylolated aminotriazine which comprises reacting a mixture of at least two ethers of a methylated triazine wherein the etherifying moieties are different and each alkyl having 1 to 6 carbon atoms in the presence of sufficient mineral acid to obtain a pH of from 0 to 3 and subsequently recovering resulting mixed ether of methylolated aminotriazine.

2. The process of claim 1 wherein said pH is from 0.5 to 1.5.

3. The process of claim 1 wherein said reaction is carried out at a temperature of 10° to 60°C.

4. The process of claim 1 wherein said reaction is carried out at a temperature of 20° to 40°C.

5. The process of claim 1 wherein said reaction is carried out in the presence of an inert organic solvent which is an aliphatic or aromatic hydrocarbon, an aliphatic primary or secondary alcohol or a halogenated hydrocarbon.

6. The process of claim 1 wherein one of said ether reactants is a methyl ether of a methylolated melamine.

* * * * *